United States Patent Office 3,384,625
Patented May 21, 1968

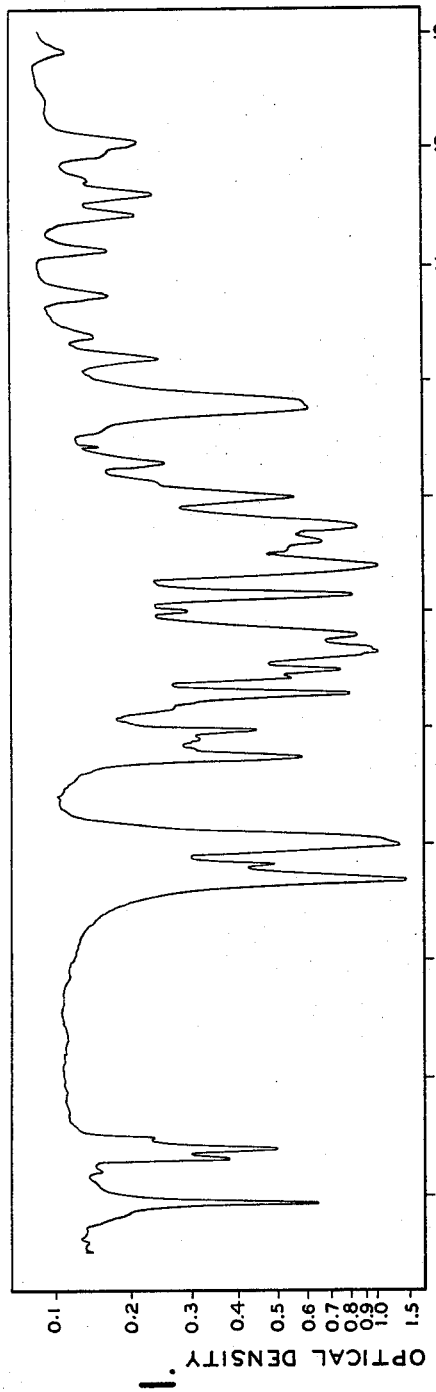
FIG.1. SPECTROGRAM OF α(DICARBETHOXYMETHYL)CAPROLACTAM
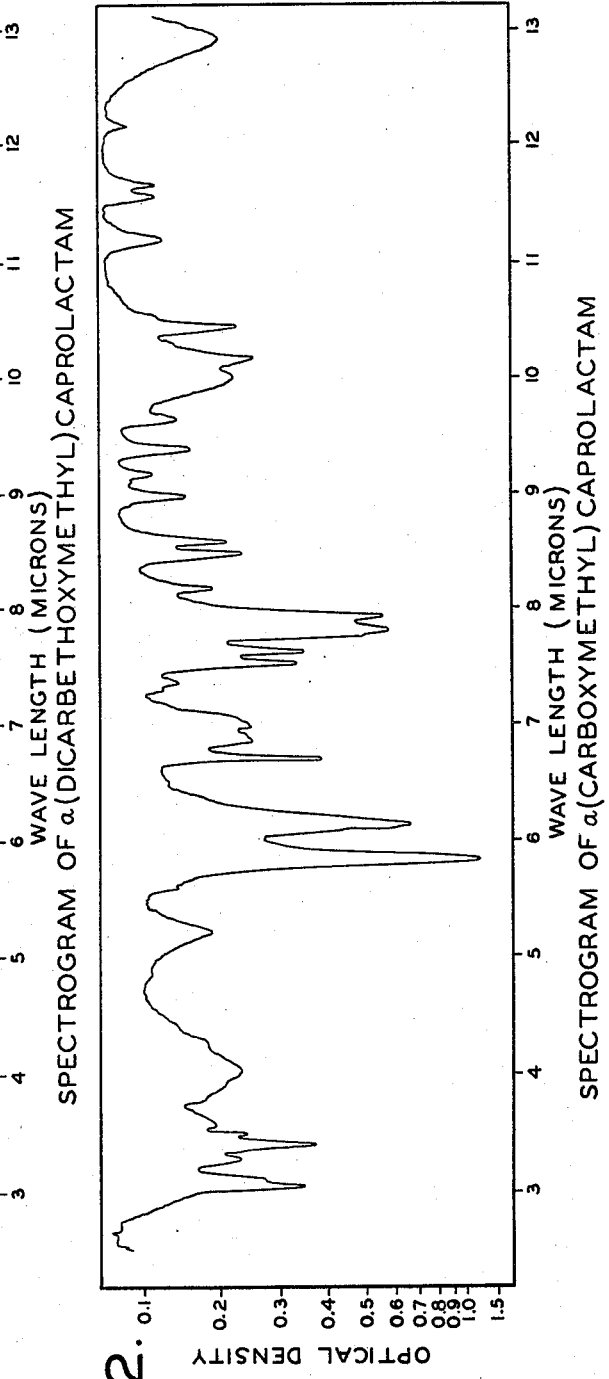
FIG.2. SPECTROGRAM OF α(CARBOXYMETHYL)CAPROLACTAM
INVENTOR
HERBERT K. REIMSCHUESSEL
BY
Kenneth D. Tremain
ATTORNEY

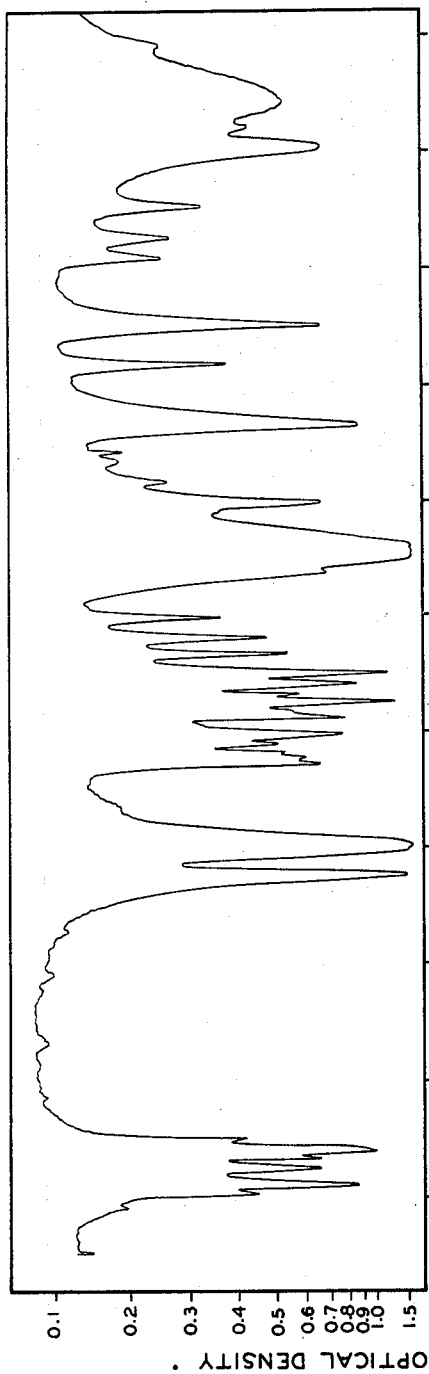
FIG. 3. SPECTROGRAM OF α(CARBETHOXYMETHYL)CAPROLACTAM
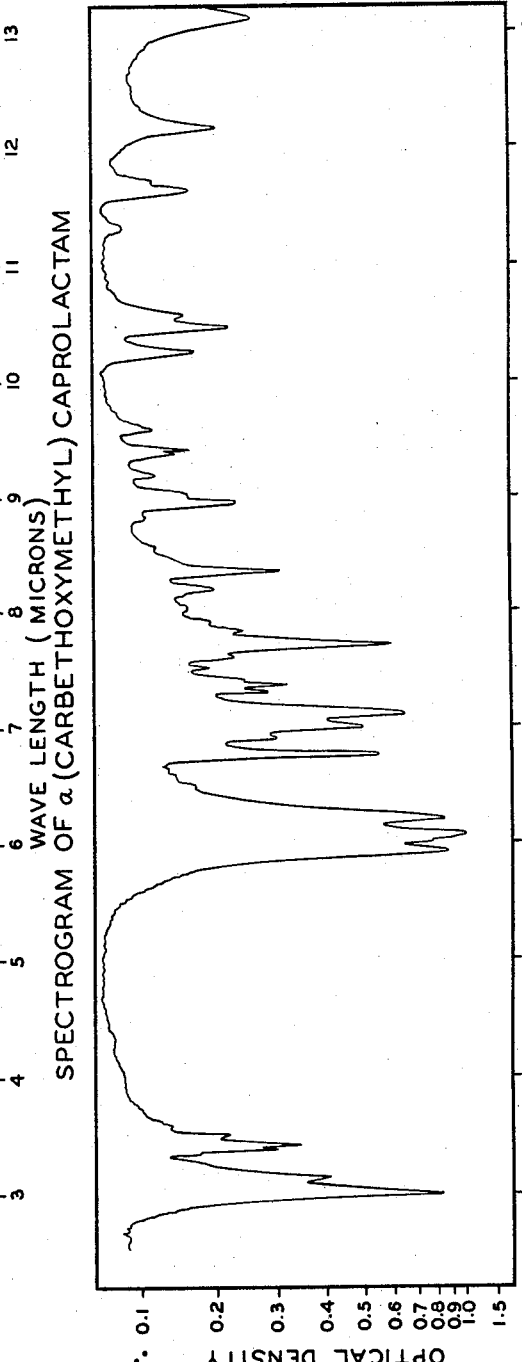
FIG. 4. SPECTROGRAM OF α(CARBAMIDOMETHYL)CAPROLACTAM

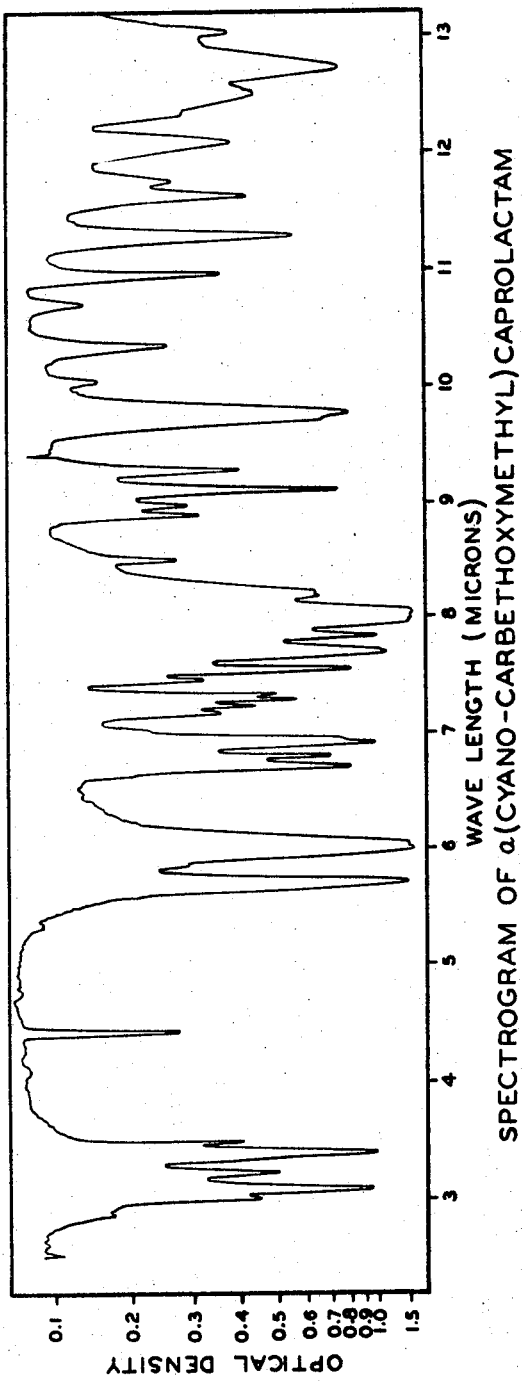

3,384,625
POLYAMIDE POLYMERIZATION PRODUCTS OF DERIVATIVES OF EPSILON-CAPROLACTAM
Herbert K. Reimschuessel, Morristown, N.J., assignor to Allied Chemical Corporation, New York, N.Y., a corporation of New York
Filed Jan. 29, 1964, Ser. No. 341,068
6 Claims. (Cl. 260—78)

This invention relates to novel monomer compounds and to high molecular weight polymers derivable therefrom. More particularly, the present invention relates to novel derivatives of e-caprolactam and to polyamides produced therefrom.

Although e-caprolactam is readily polymerizable to form useful polymers generally known as nylon 6, derivatives of e-caprolactam wherein one of the hydrogen atoms attached to a carbon atom of the heterocylic 7-membered ring is replaced by an organic radical, are not generally polymerizable. Thus, for example, alpha ethyl, and alpha propyl e-caprolactam are extremely difficult, if not impossible, to polymerize. In many applications it is desirable to employ polyamide polymers having functional organic groups pendant to the polyamide chain. The functional groups permit various gradations of polymer physical and chemical properties, unobtainable by other methods. Although mixed co-polyamides have been prepared wherein one monomer contains such functional organic groups, the simpler expedient of employing a single monomer to obtain nylon 6 polymers having pendant functional organic groups has not hitherto been accomplished.

Accordingly, it is an object of this invention to provide novel derivatives of e-caprolactam which may be converted into high molecular weight polyamide polymers useful for the production of filaments, films, and other shaped objects.

It is another object of this invention to provide novel derivatives of e-caprolactam which can be homopolymerized to form polyamides having pendant organic functional groups.

These and other objects and advantages and methods for their accomplishment will become apparent herein.

It has now been found that high molecular weight polyamides ranging from soft and soluble resins, to hard and insoluble resins may be produced by polymerization of novel alpha-substituted e-caprolactam derivatives represented by the formula:

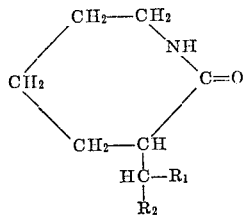

wherein $R_1$ is a meta-directing electrophilic group and $R_2$ is hydrogen or a meta-directing electrophilic group.

For purposes of this invention and the appendant claims, the term meta-directing electrophilic group means a group which is electron-attracting and which, if directly joined to a benzene nucleus, would cause substitution of positively charged entities in the meta position of the ring to the extent that at least 40 percent of the meta isomer is produced. Meta-directing electrophilic groups of this class are described in Organic Chemistry, Fieser and Fieser, D. C. Heath and Company, 2d Edition, page 595 and Chemistry of Organic Compounds, Noller, W. B. Saunders Company, 2d Edition, pages 441-2 and include trialkylammonium, alkyl sulfonyl, nitro, cyano, carboxy, formyl, sulfo, alkoxycarbonyl, carbamyl, trichloromethyl, acetyl, nitromethyl and ammonium represented respectively by the formulas: $-NR_3^+$, $-SO_2R$, $-NO_2$, $-CN$, $-COOH$, $-CHO$, $-SO_3H$, $-COOR$, $-CONH_2$, $-CCl_3$, $-COCH_3$, $-CH_2NO_2$ and $-NH_3^+$ wherein R is a lower alkyl group.

The novel alpha-substituted e-caprolactam derivatives of this invention are advantageously prepared by condensation of an alpha halogen derivative of e-caprolactam with a metallo-organic compound containing at least one meta-directing electrophilic group as defined herein or a chemical precursor capable of being converted into such a group. The alpha-halogenated e-caprolactam may be prepared in any known manner such as that described in J. Am. Chem. Soc., 80, p. 6238 (1958). The bromine derivative is generally preferred in view of its greater reactivity during the condensation reaction, but other halogens are suitable, especially chlorine which has economic advantages.

The metallo-organic compounds useful in the above method of preparing the novel alpha e-caprolactam derivatives of this invention are those compounds which, due to tautomerism or resonance stabilization possess a carbon-attached hydrogen atom replaceable by an alkali metal. Typical examples of such compounds include malononitrile, malonic esters, acetoacetic esters, acetylacetone, nitromethane, cyanoacetic esters, and other compounds analogous thereto containing activated methyl or methylene groups. The metallo-organic compound is generally prepared by treating, under anhydrous conditions, the organic compound containing the carbon-attached replaceable hydrogen with an alkali metal such as, for example, lithium, sodium and potassium.

The condensation of the alpha halogen-substituted e-caprolactam and the metallo-organic compound is preferably carried out under anhydrous conditions in an inert solvent media. Temperatures of between about 50° C. and 200° C. may be employed with temperature control effected by reflux condensers or other means. Reaction times of from 2 to 30 hours generally provide the alpha substituted e-caprolactam in yields better than 50%. The reaction product is isolated from the reaction mixture by evaporation of solvent, and washing and recrystallization of the non-volatile residue. The alpha substituted e-caprolactam derivatives of this invention are white crystalline solids, soluble in various polar and non-polar organic solvents. The novel products are identified by conventional methods of analysis such as elemental analysis, infrared spectrophotometric analysis, molecular weight determination, and chemical transformations.

The e-caprolactam derivatives of this invention may also be prepared by chemical reactions carried out on other e-caprolactam derivatives containing meta-directing electrophilic groups or chemical precursors capable of being converted into a meta-directing electrophilic group. In still further chemical transformations, the monomers of this invention may be converted into other useful compounds such as derivatives of amino caporic acid, and molecules containing 2 e-caprolactam rings.

The production of polymers from the e-caprolactam derivatives of this invention may be accomplished by procedures generally known for the preparation of high molecular weight polyamides from e-caprolactam. The polymerization is usually carried out at temperatures between 75 and 300° C., preferably in an inert atmosphere. The polymerization may be carried out in the presence of catalysts, viscosity stabilizers, antioxidants, pigments, fillers, foaming agents, plasticizers, and other additives commonly employed in the production of polymer compositions. Other monomer species, polymerizable under the applied reaction conditions or polymerizable thereafter by suitable activaion, may also be present. Depending upon the composition of the polymerization reaction mixture, the reaction is completed within a few minutes to 20 hours. The polymer product may be purified and further processed by conventional methods.

Referring to the drawings, FIG. 1 is an infrared absorption spectrum of the product obtained in Example 1 below.

FIG. 2 is a like spectrum of the product of Example 3 below.

FIG. 3 is a like spectrum of the product of Example 4 below.

FIG. 4 is a like spectrum of the product of Example 5 below.

FIG. 5 is a like spectrum of the product of Example 6 below.

The following examples are presented to illustrate preferred embodiments of the present invention, and are not intended to be considered as limitative of the scope of the invention. All parts and percentages are by weight unless otherwise specified.

Example 1.—α(dicarbethoxymethyl) caprolactam

Into a 3 liter three-necked flask equipped with a stirrer, dropping funnel and a reflux condenser carrying a drying tube were placed 600 ml. anhydrous ethanol. With frequent cooling, 23 g. of sodium were added in large pieces. The solution was heated under gentle reflux and over a period of one hour 400 g. of redistilled diethyl malonate were added. The heating was continued for three additional hours. After this time 192 g. of α-bromo caprolactam dissolved in 300 ml. dry benzene were added. The reaction mixture was then heated under reflux for 5 hours and allowed to stand at room temperature overnight. The ethanol was then removed under aspirator vacuum. The remaining solution was washed with 400 ml. 10% aqueous HCl. The aqueous phase was extracted several times with ether. The ether was combined with the organic phase and washed with a concentrated solution of sodium bicarbonate and water, and then dried over anhydrous sodium sulfate. After removal of the solvents and excess malonic ester under vacuum, the reaction product was recrystallized from n-hexane. The dried crystals have a melting point of 94–96° C., and weigh 175 grams, representing a yield of 65%. Elemental analysis of the product is as follows:

Calc.: 57.55% C; 7.8% H; 5.16% N. Found: 57.70% C; 7.76% H; 5.46% N.

The infrared absorption spectrum of the product is shown in FIG 1 of the drawings.

Example 2.—α(dicarboxymethyl) caprolactam 67.5 g. of potassium hydroxide were dissolved in 250 ml. 99.8% ethanol. To this solution were added 135.6 g. of α(dicarbethoxymethyl) caprolactam product prepared in Example 1 dissolved in 150 ml. ethanol. The resulting solution was heated under reflux for 20 hours. After cooling, the precipitated dipotassium salt was collected and washed first with ethanol and then with ether. The yield was 141.7 g. (97.5%).

The dipotassium salt was dissolved in 100 ml. water. The solution was extracted with ether, cooled below 0° C., and acidified with concentrated HCl keeping the temperature at 0° C.

The precipitate was collected and washed with a small quantity of cool methanol and ether. 110 g. of dry crystalline product is thereby obtained. The crystals melt with decomposition at 160° C. For the analysis a small portion was recrystallized from methanol. Elemental analysis of the product is as follows:

Calc.: 50.23% C; 6.09% H; 6.51% N. Found: 50.28% C; 6.13% H; 6.33, 6.50% N.

Example 3.—α(carboxymethyl) caprolactam 21.52 g. of the α(dicarboxymethyl) caprolactam prepared in Example 2 was added in small portions to 150 ml. o-dichloro benzene at 160–165° C. The resulting clear solution was hot filtered from some resinous byproducts. Upon cooling, the product crystallized, providing a yield of 11.4 g. (67%). The product recrystallized, from hot o-dichloro benzene, has a melting point of 176–177° C. Elemental analysis of the product is as follows:

Calc.: 56.13% C; 7.65% H; 8.18% N. Found: 56.05% C; 7.57% H; 8.26% N.

The infrared absorption spectrum of the product is shown in FIG. 2 of the drawings.

Example 4.—α(carbethoxymethyl) caprolactam 34.24 g. of the α(carboxymethyl) caprolactam product of Example 3 were dissolved in a mixture of 120 ml. ethanol, 20 ml. benzene and 2 ml. concentrated $H_2SO_4$. This solution was refluxed in an esterification apparatus for 4 hours. The excess solvent was removed by distillation and the residue dissolved in ether. The ether solution was washed with saturated sodium bicarbonate solution and dried over anhydrous sodium sulfate. The ether was removed in vacuum and the crystalline residue recrystallized from n-hexane giving a yield of 29.3 g. (74%). The crystalline product has a melting point of 76.5–77.5° C., and an elemental analysis as follows:

Calc.: 60.28% C; 8.6% H; 7.03% N. Found: 60.29% C; 8.65% H; 7.00% N.

The infrared absorption spectrum of the product is shown in FIG. 3 of the drawings.

Example 5.—α(carbamidomethyl) caprolactam 19.93 g. of the α(carbethoxymethyl) caprolactam product of Example 4 was dissolved in 150 ml. concentrated aqueous ammonium hydroxide. The solution was allowed to stand for 48 hours at room temperature. It was then distilled under vacuum and the residue recrystallized from ethanol giving a yield of 11.1 g. (65%). The crystalline product has a melting point of 202.3° C., and an elemental analysis as follows:

Calc.: 56.45% C; 8.29% H; 16.46% N. Found: 57.34% C; 8.49% H; 16.01% N.

The infrared absorption spectrum of the product is shown in FIG. 4 of the drawings.

Example 6.—α(cyano-carbethoxymethyl) caprolactam

A dispersion of 46 g. of sodium was prepared in 2 liters of toluene. The toluene was then replaced by anhydrous ethyl ether. To this dispersion was then added a solution of 500 g. of ethyl cyano acetate dissolved in 700 ml. ether. The reaction mixture was held for 24 hours at room temperature during which time all sodium had reacted. To this mixture were then added 380 g. of α-bromo caprolactam dissolved in 1200 ml. benzene. After the addition the reaction mixture was heated under reflux for 24 hours after which the reaction mixture was worked up as described in Example 1 for the α(dicarbethoxymethyl) caprolactam producing a yield of 232 g. (54%). The crystalline product has a melting point of 153° C., and an elemental analysis as follows:

Calc.: 58.91% C; 7.19% H; 12.49% N. Found: 59.02, 59.25% C; 7.32, 7.37% H; 12.79, 12.91% N.

The infrared absorption spectrum of the product is shown in FIG. 5 of the drawings.

The infrared analysis of the products of Examples 1 to 6 were carried out with a Perkin-Elmer double beam spectrophotometer, Model 21, equipped with a sodium chloride prism. The spectra were recorded as solids in potassium bromide wafers and are shown in the drawings as optical density plotted against wave length of the incident beam in microns.

Referring to the drawings, it will be noted that all spectra in FIGS. 1 to 5 show bands in the 3.2–3.3 micron and 3.1–3.15 micron regions. Stemming from N—H stretching vibrations these bands are typical for cyclic lactams. All spectra show the amide I band in the 6.0 micron region which is typical for the carbonyl absorption of cyclic lactams consisting of unstrained lengths of 6 or more carbon atoms. In the case of the α(carboxymethyl) caprolactam (FIG. 2) this band occurs at 6.15 microns. In the spectra of all compounds except that of the α(carboxamidomethyl) caprolactam (FIG. 4) the so-called amide II band at 6.2 microns is missing. Its occurrence in the spectrum of the latter compound is expected because of the presence of the primary amide group. All compounds absorb in the 7.7–8.4 micron region causing the so-called amide III band. The spectra in all of the figures show an intense band in the 5.7–5.8 micron region which in the case of the α(dicarbethoxymethyl) caprolactam (FIG. 1) has been split into two bands at 5.7 and 5.8 microns. Absorption in that region is attributed to C=O stretching vibrations while the bands in the 9.6–9.8 micron and the 8.4 micron regions stem from C—O stretching vibrations.

The spectrum of α(carbamidomethyl) caprolactam (FIG. 4) shows, in addition to the amide II band, a band at 7.1 microns which may be assigned to C—N stretching absorption. This band is missing in N-substituted amides.

The spectrum of α(carboxymethyl) caprolactam (FIG. 2) shows a broad band at 4.0 microns assigned to OH stretching vibrations. The spectrum of this compound exhibits another broad band at 5.2 microns which is not present in the spectra of the other caprolactam derivatives. Absorption in this region has been observed for most amido acids.

The spectrum of α(cyano-carbethoxymethyl) caprolactam (FIG. 5) shows the amide I and amide III bands at 6.0 and 8.1 microns, respectively, and an intense band at 4.43 microns. The latter has been assigned to C≡N stretching vibrations.

The following Examples 7 to 12 will illustrate the production of polyamides from the novel ε-caprolactam derivatives of this invention.

Example 7

10 g. of the α(carboxymethyl) caprolactam from Example 3 are placed in a test tube. The system is flushed repeatedly with nitrogen and then heated at 225° C. for 1 hour maintaining a nitrogen atmosphere. After that time a colorless, transparent, hard polymer forms, having the shape of the test tube. This polymer does not melt or decompose at temperatures below 300° C., and is insoluble in all common solvents.

Example 8

Equal parts of α(carboxymethyl) caprolactam from Example 3 and α(carbethoxymethyl) caprolactam from Example 4 are heated in a nitrogen atmosphere at 255° C., for 8 hours. The formed polymer is a transparent, soft material which starts to flow at 110° C., and melts without any signs of decomposition at 160° C. The polymer is found to be soluble in organic solvents such as chloroform, benzene and acetic acid.

Example 9

Equal parts of α(carboxymethyl) caprolactam from Example 3 and ε-caprolactam are heated in a nitrogen atmosphere at 255° C., for 20 hours. The formed polymer is translucent. It softens at 218° C., and melts at 242° C.

Example 10

19 parts of ε-caprolactam, 1 part of ε-aminocaproic acid and 0.096 part of α(carboxymethyl) caprolactam from Example 3 are placed in a stirred reactor and heated for 5 hours at 255° C. The formed polymer is extruded, washed with hot water, dried and spun to fibers. These fibres are drawn without breaking at a drawing ratio of 1:6. The tensile strengths of the drawn fibers are found to be 10.5–11.0 grams per denier, and the corresponding elongations are 11–12%.

Example 11

Equal parts of α(dicarbethoxymethyl) caprolactam of Example 1 and water are placed in an autoclave and heated at 270° C., maintaining a pressure of 20 atmospheres of nitrogen for 2 hours. After that time the pressure is released and the reaction product heated for an additional 2 hours at 270° C., in a nitrogen atmosphere. The polymer thus obtained is a transparent, hard material which softens at 95° C., and melts at 130° C.

Example 12

8 parts of hexamethylene diammonium adipate, 2 parts of α(carboxymethyl) caprolactam from Example 3, and 10 parts of water are placed in an autoclave and heated at 280° C., maintaining a pressure of 20 atmospheres of nitrogen for 2 hours. After that time the pressure is released and the reaction mixture is heated for an additional 2 hours at 280° C., in a stream of nitrogen at atmospheric pressure. The polymer thus produced is a hard, crystalline material which melts at 230° C.

The novel polymers of this invention may be employed in the production of end products such as adhesives, coating compositions, textile yarns, tire yarns, bristles, films, molded products, and other shaped articles. Such end products may be chemically modified by reactions with the groups $R_1$ or $R_2$, and may be subjected to commonly employed treatment processes such as dyeing, embossing, printing, irradiation, drawing, machining, laminating, and other conventional operations.

It will be obvious to those skilled in the art that various changes may be made without departing from the spirit of the invention and accordingly, the invention is limited only as indicated in the appended claims.

I claim:
1. The polyamide polymerization product of a compound having the formula:

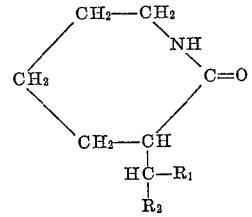

wherein $R_1$ is carboxy, alkoxycarbonyl or carbamyl and $R_2$ is hydrogen or a group represented by $R_1$.

2. A composition of matter consisting essentially of the polyoxide copolymerization product of alpha (carboxymethyl) caprolactam and alpha (carbethoxymethyl) caprolactam.

3. A composition of matter consisting essentially of the polyamide copolymerization product of alpha (carboxymethyl) caprolactam and epsilon caprolactam.

4. A composition of matter consisting essentially of the polyamide copolymerization product of alpha (carboxymethyl) caprolactam, epsilon aminocaproic acid and epsilon caprolactam.

5. A composition of matter consisting essentially of the polyamide polymerization product of alpha (dicarbethoxymethyl) caprolactam.

6. A composition of matter consisting essentially of the polyamide polymerization product of alpha (carboxymethyl) caprolactam and hexamethylene diammonium adipate.

References Cited

UNITED STATES PATENTS

| 3,037,001 | 5/1962 | Becke et al. | 260—78 |
| 2,856,387 | 10/1958 | Jacobson et al. | 260—78 |
| 2,859,208 | 11/1958 | Hollyday | 260—78 |
| 2,698,845 | 1/1955 | Mastin et al. | 260—239.3 |
| 2,865,912 | 12/1958 | Pohleman et al. | 260—239.3 |

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,384,625            May 21, 1968

Herbert K. Reimschuessel

It is certified that error appears in the above identified patent and that said Letters Patent are hereby corrected as shown below:

Column 2, line 71, "activaion" should read -- activation --. Column 6, line 47, "polyoxide" should read -- polyamide --.

Signed and sealed this 14th day of October 1969.

(SEAL)
Attest:

Edward M. Fletcher, Jr.
Attesting Officer

WILLIAM E. SCHUYLER, JR.
Commissioner of Patents